3,328,304
CHELATING AGENTS AND METHODS FOR
THEIR MANUFACTURE
Alfred R. Globus, Bayside, N.Y., assignor to Guardian Chemical Corporation, Long Island City, N.Y., a corporation of Delaware
No Drawing. Filed July 31, 1964, Ser. No. 386,744
15 Claims. (Cl. 252—80)

This invention relates to new chelating or sequestering agents useful in the dairy industry to prevent milkstone, in breweries to prevent beerstone, and as pharmaceutical agents for the treatment and prevention of urinary calcification, to processes for their manufacture, and to methods for employing the same.

This invention is a continuation-in-part of application Ser. No. 300,687, filed Aug. 7, 1963, and now abandoned.

Sequestering and/or chelating agents, characterized by an ability to solubilize poorly soluble or insoluble calcium salts have been employed for the aforesaid purposes heretofore. However, the known agents must be used in large quantities in order to supply a sufficient concentration of sequestering agents to bind the calcium. Thus, with the known sequestering agents, maintenance of effective concentration requires 4 to 10 times the weight of a sequestering agent as is required with the compositions of the invention. In connection with the treatment of urinary calcifications, the known agents are relatively ineffective or else cannot be used with any safety, or both. The toxicity of the known chelating agents is largely attributable to the ability thereof to bind calcium as the same is present in the body and generally in the blood-stream into the form of a complex or chelate in which the metal is held in non-ionizable form, thereby giving rise to such untoward side effects as tetany and/or other symptoms associated with calcium deficiency.

It has been found that unlike most of the sequestering and/or chelating agents in clinical use, the compounds of the invention show few untoward side effects being capable of actively binding the calcium to a surprisingly high degree. The complex or chelate, however, is rapidly destroyed by the body, being in the main split by digestive and oxidative processes taking place in the blood-stream whereby the ability of the sequestering agent to bind calcium is reversed where the same would prove detrimental.

Thus, the products of the invention in their ability to chelate calcium may be used as a solvent for many types of calcifications. In particular, the products of the invention are excellent sequestering agents for calcium carbonate, tri-calcium phosphate, and calcium oxalate, as well as for magnesium ammonium phosphate. The products of the invention may be used to facilitate the removal of calcium deposits from food lines as, for instance, beerstone from brewery lines and milkstone from dairy piping lines. Additionally, the compounds of the invention may be utilized as additives in connection with pharmaceutical and/or cosmetic preparations for the purpose of sequestering metallic ions whereby the activity of the preparation is enhanced, or the compounds may be used to clarify a pharmaceutical and/or cosmetic preparation where the cloudiness thereof may be due to insoluble polyvalent metal salts and particularly calcium salts. The products of the invention find particular use as medicinal agents serving to dissolve calculi of the phosphate and carbonate type and so soften mixed phosphate-oxalate compositions. The compounds of the invention are particularly useful in alkaline-encrusted cystitis, for prophylaxis in the preventing of plugging of catheters by calcium salts and to prevent formation of stones.

The sequestrants of the invention have the following composition:

| | Percent by weight |
|---|---|
| Citric acid, anhydrous | 52–57 |
| D-gluconic acid (primarily as the lactone) | 7–10 |
| Magnesium hydroxycarbonate | 25–29 |
| Magnesium acid citrate ($MgHC_6H_5O_7$) | 3–5 |
| Calcium (as the carbonate) | .6–2 |
| Water, combined and free | 5.6–7 |

A 10% solution of the above sequestering composition consists approximately of the following:

| | Percent |
|---|---|
| Free D-gluconic acid | 0.2–0.3 |
| Gluconolactone | 0.07–0.1 |
| Citric acid | 0.3–0.6 |
| Magnesium acid citrate | 5.3–5.9 |
| Magnesium acid gluconate | 0.3–0.6 |
| Complex gluconocitrates of magnesium | 0.5–1.2 |
| Magnesium bicarbonate | 0.6–0.8 |
| Calcium bicarbonate | 0.1–0.2 |

The sequestering compositions of the invention may be prepared by the steps of heating a mixture of citric acid (in its hydrated form), D-gluconic acid, and a mildly alkaline especially prepared magnesium hydroxycarbonate at a temperature at which water will be split off from the gluconic acid and the hydrated citric acid converted substantially to the anhydrous form but below the decomposition point thereof.

The compositions of the invention may accordingly be prepared by merely admixing the gluconic and citric acids with the mildly alkaline magnesium hydroxycarbonate to form an intimate mixture, and heating the mixture to a temperature at which the water will be split off from the acids but which is below the decomposition point thereof.

The nature of the magnesium hydroxycarbonate used is very important and critical with respect to the effectiveness of the products obtained as sequestering agents. The magnesium hydroxycarbonate can best be described as being mildly alkaline. The magnesium hydroxycarbonate is derived from magnesium oxide. Magnesium oxide or hydroxide per se is not satisfactory, being too alkaline, and therefore tending to form salts with the weak acids used as starting materials in the process of the invention. Magnesium carbonate, on the other hand, is too neutral. The addition of magnesium hydroxide to magnesium-carbonate slurry, followed by drying and grinding, produces an excellent mildly alkaline magnesium hydroxy-carbonate for use in the process of the invention. Alternatively, mildly alkaline magnesium hydroxycarbonate can be prepared by the carbonation of the magnesium hydroxide slurry followed by drying and grinding.

The equivalent calcium salt is not suitable because of the introduction by its use of sufficient calcium to destroy the acid reaction products of sequestering ability for calcium.

The essence of the invention resides in the discovery that a mixture of citric acid (anhydrous), D-gluconic acid (primarily as the lactone), magnesium hydroxycarbonate, magnesium acid citrate, and water both in the combined and free states, is characterized by a marked ability to chelate calicum and further is non-toxic when administered according to a prescribed regimen. The enhanced sequestering ability is believed due to the finding that the magnesium hydroxycarbonate acts to increase the reaction rate of the sequestering agent with calcium.

The preparation of the magnesium hydroxycarbonate is hereinafter set forth in detail, although it is to be understood that other methods of producing the same may be employed.

A heavy slurry of magnesium carbonate with magnesium hydroxide is prepared having a ratio of not less than 2½ mols of magnesium carbonate to each mol of magnesium hydroxide and preferably having a ratio of 4 mols of magnesium carbonate to 1 mol of magnesium hydroxide. The slurried material is first dried under vacuum or, alternatively, dried at low temperatures in order to remove the water, and the dried product heated to a temperature of at least 125° C. and preferably to a temperature of between 150–175° C., but not higher than 220° C. as the same may result in inactivation. During the drying, the weight loss of the resulting magnesium hydroxycarbonate as compared with the previously thoroughly dried product used as starting material is from 3.5–3.9%.

The heating is most advantageously carried out slowly in order to avoid decomposition by undue calcination with a resultant decrease in activity. Generally, the temperature of the dried powder is raised slowly over a period of 4–6 hours to the final temperature and maintained at that temperature for another 8–16 hours in order to attain equilibrium. The resulting white to slightly yellowish powdery product is ground and screened as some lumping may have taken place.

The ground material is added to the starting mixture of citric acid and gluconic acid which has first been dried under vacuum at 60–70° C. If the starting citric acid is designated as "anhydrous" no preliminary drying may be necessary.

The dried magnesium hydroxycarbonate is employed in an amount of from 15–48 parts by weight, and preferably from 20–40 parts by weight per 100 parts by weight of the dry acids.

After intimate mixing and grinding, if the same is necessary, the mixture is subjected to slow and gradual heating to a temperature above the boiling point of water, generally to about 120° C., and most preferably between 110–125° C. and the heating continued for a period of 15–24 hours. Temperature of 130° C. must be avoided as the use of excessively high temperatures will cause fusing of the product into a solid cake.

The time required for the heating may be reduced somewhat by treating the product in the form of thin layers and also by sweeping out the atmosphere in the heating oven by means of an inert gas, such as, for example, nitrogen or argon. The use of carbon dioxide must be avoided as the same is not inert in the instant process and under no circumstances can be employed.

During the heating, the mixture of previously thoroughly dried powders again splits off water, approximately 3.6–4.2% by weight of the charge, and then attains equilibrium. Further heating at these temperatures produces very little weight change. The water which is split off appears to be derived from the original acids and not by reaction of the acids with the magnesium hydroxycarbonate, the latter remaining substantially unchanged as is evidenced by the fact that very little carbon dioxide is released during the heating steps as would have been the case if an appreciable reaction had taken place between the acids and the magnesium hydroxycarbonate.

The resulting product has a composition as set out above. It is of great interest to note that very little magnesium salts are formed during the processing as can be determined by suspending the product in an anhydrous organic fluid and separating the product as far as possible by differential centrifuging.

In accordance with the preferred embodiment there is incorporated into a mixture of the dried free acids (citric and gluconic) and magnesium hydroxycarbonate, anhydrous magnesium acid citrate in a ratio of 1 part magnesium acid citrate to 5–10 parts of magnesium hydroxycarbonate present in the mixture. The citrate must be anhydrous and is advantageously prepared by forming a heavy slurry of magnesium oxide with concentrated citric acid employing slightly less citric acid than is called for stoichiometrically, spray-drying to a solid or, alternatively, by evaporating the slurry, then crushing the dried product, followed by heating in warm air at a temperature of 120° F.–135° F. until the moisture is reduced to less than 1% water by weight. The resulting magnesium acid citrate is thereafter added to the mixture of dried citric and gluconic acids and magnesium hydroxycarbonate. The same procedure as set out above and essentially the same product results but the reaction is much more readily controllable and the resulting temperatures do not tend to produce carmelization and fushion of the reaction mixture as sometimes occurs when the magnesium acid citrate is not initially present.

The acid citrate employed in accordance with the invention is slightly more neutral than is characteristic of a compound as conventionally available. This is important because it sharply decreases the reactivity of the compound.

In the reaction described in the foregoing between the anhydrous acids and the magnesium hydroxycarbonate there is a tendency to form some of the magnesium salts with the liberation of water which can cause this reaction to continue unless the water vapor is rapidly withdrawn. The presence of the magnesium acid citrate in the amount that is otherwise produced before equilibrium results, produces the equilibrium rapidly without the rapid evolution of water, severe rises in temperature and subsequent carmelization often to a degree where the resulting product is of no value. It has been found that in the preparation of small batches, control of the reaction is adequate without the acid citrate but that in the preparation of large batches under practical conditions it is essential.

The product of the process of the invention is of an off-white to a distinctly yellowish color. It forms solutions which are clear but which are distinctly yellow in color. The powder is perfectly stable in closed containers but does pick up moisture and/or carbon dioxide when left exposed to air. The solution tends to become somewhat cloudy upon standing and to form a product which coagulates and precipitates. This is due to the presence of minor quantities of somewhat insoluble components in the final dried product which are derived from the decomposition of the original acids.

After standing for 7–10 days, the solution can be filtered and will then remain clear for many months. The solution is acid on reaction having a pH in a 10% solution of 3.9–4.1. This solution is characterized, as noted above, by a yellowish color, but often shows minute dark to black specks which can be filtered from the solution if desired. Both the color of the solution and the specks appear to be due to some slight carmelization of the product during the last processing stage.

When an aqueous solution is prepared, magnesium hydroxycarbonate present in the mixture is converted to a great deal into the magnesium salts of the various acid components. Some of the resulting salts are of a complex nature. It is of further interest to note that, if the original acids are not adequately dried and dehydrated and the magnesium hydroxycarbonate not calcined as described, only the magnesium salts of the original acids are produced which form a solid mass of comparatively little value.

The following examples are illustrative of the product and process of the present invention, but are not to be construed as limiting.

EXAMPLE 1

A slurry of 3.5 mols of magnesium carbonate and 1 mol of magnesium hydroxide was prepared. The slurried material was dried in order to remove the water and the dried product heated to 115° C. for 16 hours. The resulting powder was ground and added to a mixture of anhydrous citric and gluconic acids. The dried magnesium hydroxycarbonate was employed in an amount of 45 parts by weight per 100 parts by weight of the dry acids. The mixture was subjected to heating at a temperature of 115°

C. for 16 hours. The product was off-white to yellowish in color and had the following composition:

| | Percent |
|---|---|
| Free citric acid (anhydrous) and D-gluconic lactones | 59 |
| Magnesium salts of said acids | 6 |
| Magnesium hydroxycarbonate | 32 |
| Citroconic acid | 0.2 |

Balance, inert materials.

EXAMPLE 2

Example 1 was repeated except that the mixture of acids was replaced with an equal amount of a mixture of gluconic and citric acid in its hydrated form. The resulting product had the following composition:

| | Percent |
|---|---|
| Free citric acid (anhydrous) and D-gluconic lactones | 53.7 |
| Magnesium salts of said acids | 7.0 |
| Magnesium hydroxycarbonate | 33.5 |

Balance, inert materials.

EXAMPLE 3

Example 1 was again repeated except that 53 parts of citric acid, 7 parts of gluconic acid, 26 parts of magnesium hydroxycarbonate, and 4 parts of magnesium acid citrate were used. The resulting product had the following composition:

| | Percent |
|---|---|
| Free citric acid (anhydrous) and D-gluconic lactones | 57.3 |
| Magnesium salts of said acids | 5.0 |
| Magnesium hydroxycarbonate | 24.0 |

Balance, inert materials.

The unexpectedly high degree of activity of the sequestering agent produced in accordance with the invention has been borne out in clinical studies carried out using said compounds and further tests have also substantiated its apparent freedom from toxicity even when administered intravenously and intraperitoneally. As compared with the compounds of the invention, the typical chelating agent for calcium and other heavy metallic ions, ethylenes, diamine tetra-acetic acid (sodium salt) when administered orally to the extent of only 1 gm./kg. of body weight in animals, will produce convulsions followed by death. In contrast, the consumption orally of the same amount of the compounds herein claimed will produce only a temporarily mild intestinal disturbance.

When a 10% solution of the composition of the invention is titrated with calcium chloride solution in the presence of ammonium oxalate to an end point consisting of a permanent observable turbidity consisting of a calcium oxalate precipitate, 415 cc. of 1% calcium chloride solution is required as against 65–90 cc. when an equal weight of the pure original acids are employed. This indicates an increase in sequestering powder of about 450–675%.

The novel compositions of the invention are preferably supplied as a sterile powder soluble in water. The powder contains the citric acid (anhydrous) and D-gluconic acid (primarily as the lactane), magnesium hydroxycarbonate, magnesium acid citrate, calcium (as the carbonate)[1] and water (combined and free). For use clinically, a 10% solution having a pH of 3.9 is produced by adding 100 g. of the compound in accordance with the invention to 1000 ml. of distilled water. The solution is stable for long periods and may be boiled for sterilization without losing its potency. The solution containing the sequestering agent in accordance with the invention constitutes an excellent solvent for calcium phosphate, calcium carbonate, and magnesium ammonium phosphate stones.

The compositions in accordance with the invention are not toxic and in the concentration recommended non-irritating to the mucosa of the urinary tract. The compositions in accordance with the invention have been given in large doses to rabbits as well as in the prescribed regimen both intravenously and intraperitoneally clinically without any ill effects.

The compounds in accordance with the invention are particularly useful as therapy whenever dissolution or reduction in size of certain urethral or bladder calculi is desired. The poor risk patient or one who has submitted to multiple surgical procedures for calculi often falls into this category. The compound is especially useful in the prevention of calcification of catheters draining the urinary tract. This problem is frequently encountered when nephrostomy or urethral catheter drainage is required for long periods. Inasmuch as the calcification that forms in these cases, calcium phosphate and magnesium ammonium phosphate is soluble in solutions of the product in accordance with the invention, the prevention of encrustation in such catheters for extended periods can be undertaken.

Another indication for the use of the compounds in accordance with the invention is in subjects following litholapaxy. Evacuation of the tiny fragments of stone which may become enmeshed in the bladder neck mucosa may be impossible. These particles often act as nuclei for the formation of new calculi. The compounds of the invention in the form of aqueous solutions thereof have been useful in dissolving this calcareous material by way of urethral catheter irrigation.

The compounds of the invention are preferably administered as a 10% solution in distilled water by continuous drip of at least 1 cc./minute or intermittent instillation as required. For use in the prevention of calcification of inlying catheters, 1 oz. t.i.d. is required. The compounds in accordance with the invention in the form of solutions thereof may be used for irrigation continuously over periods of days and weeks without any contra-indication.

The 10% solutions are prepared by the addition of the dry sequestering agent to the water. Rapid stirring, with low additions of the powder to the water and oversize containers will eliminate the tendency to overflow during preparation. The solution thus formed is to be left uncovered until all evolution of gas has ceased.

I claim:

1. Process for the preparation of a calcium sequestering agent which comprises forming a mixture of citric acid, D-gluconic acid, and mildly alkaline magnesium hydroxycarbonate, and heating said mixture at a temperature at which water will be split off from said acids but below the decomposition point thereof to form a mixture containing anhydrous citric acid, D-gluconic acid substantially as the lactone and magnesium acid citrate wherein said mildly alkaline magnesium hydroxy carbonate is utilized in an amount of from 15–48 parts by weight per 100 parts by weight of said acids and said citric acid and D-gluconic acid are present in amounts of 52–57% by weight and 7–10% by weight respectively, the latter primarily being present as lactone.

2. Process according to claim 1, wherein said mildly alkaline magnesium hydroxycarbonate is prepared by heating 2½ to 4 mols of magnesium carbonate with 1 mol of magnesium hydroxide at a temperature of from 125–175° C.

3. Process according to claim 1, which comprises utilizing said mildly alkaline magnesium hydroxycarbonate in an amount of 20–40 parts by weight per 100 parts by weight of said acids.

4. Process according to claim 1, which comprises heating said mixture to a temperature of 110–125° C.

5. Process according to claim 1, which comprises incorporating into said mixture of citric acid, D-gluconic acid and mildly alkaline magnesium hydroxycarbonate one part of magnesium acid citrate for every 5–10 parts magnesium present in said mixture.

6. Process according to claim 5, wherein said magnesium acid citrate is prepared by heating magnesium hy-

---

[1] Introduced as an impurity with the starting materials.

droxy with anhydrous citric acid at a temperature of from 120–135° F.

7. Process according to claim 6, wherein said anhydrous citric acid is employed in less than the stoichiometrically necessary amount for forming said magnesium acid citrate.

8. A calcium sequestering composition consisting essentially of

| | Percent by weight |
|---|---|
| citric acid, anhydrous | 52–57 |
| D-gluconic acid (primarily as the lactone) | 7–10 |
| magnesium hydroxycarbonate | 25–29 |
| magnesium acid citrate ($MgHC_6H_5O_7$) | 3–5 |
| calcium (as the carbonate) | .6–2 |
| water, combined and free | 5.6–7 |

9. A calcium sequestrant comprising a 10% aqueous solution consisting essentially of

| | Percent |
|---|---|
| free D-gluconic acid | 0.2–0.3 |
| gluconolactone | 0.07–0.1 |
| citric acid | 0.3–0.6 |
| magnesium acid citrate | 5.3–5.9 |
| magnesium acid gluconate | 0.3–0.6 |
| complex gluconocitrates of magnesium | 0.5–1.2 |
| magnesium bicarbonate | 0.6–0.8 |
| calcium bicarbonate | 0.1–0.2 |

10. A calcium sequestrant according to claim 9 having a pH of 3.9–4.1.

11. A calcium sequestrant according to claim 9 having a pH of 4.

12. A method of sequestering calcium which comprises contacting the calcium containing material to be treated with a composition consisting essentially of

| | Percent by weight |
|---|---|
| citric acid, anhydrous | 52–57 |
| D-gluconic acid (primarily as the lactone) | 7–10 |
| magnesium hydroxycarbonate | 25–29 |
| magnesium acid citrate ($MgHC_6H_5O_7$) | 3–5 |
| calcium (as the carbonate) | .6–2 |
| water, combined and free in the form of its aqueous solution | 5.6–7 |

13. The method of preventing the formation of calcifications and of dissolving calcifications once they have formed, which comprises contacting the calcifications to be treated with a composition consisting essentially of

| | Percent by weight |
|---|---|
| citric acid, anhydrous | 52–57 |
| D-gluconic acid (primarily as the lactone) | 7–10 |
| magnesium hydroxycarbonate | 25–29 |
| magnesium acid citrate ($MgHC_6H_5O_7$) | 3–5 |
| calcium (as the carbonate) | .6–2 |
| water, combined and free | 5.6–7 |

14. The method of claim 13, wherein said composition is in the form of an aqueous 10% solution.

15. The method of claim 13, wherein said composition is in the form of an aqueous 10% solution having a pH of 3.9–4.1.

References Cited

UNITED STATES PATENTS

| 2,491,452 | 12/1949 | Kern et al. | 167—65 |
| 2,674,523 | 4/1954 | McDonald et al. | 252—89 |
| 3,130,153 | 4/1964 | Keller | 252—180 X |

FOREIGN PATENTS

| 595,662 | 4/1960 | Canada. |

OTHER REFERENCES

Bergy Am. J. of Pharm., vol. 126, pages 208–209, June 1954.

Martell, The Chemistry of Metal Chelate Comp. Prentice-Hall 1956, pp. 518, 541, 542 and 543.

Merck Index, 7th ed. Merck and Co. Rahway, N.J., 1960, pp. 266, 484 and 626.

LEON D. ROSDOL, *Primary Examiner.*

W. E. SCHULZ, *Assistant Examiner.*